No. 787,697. PATENTED APR. 18, 1905.
C. REDD.
MACHINE FOR CLOSING AND SEALING THE BOTTOM FLAPS OF CARTONS.
APPLICATION FILED DEC. 26, 1903.
12 SHEETS—SHEET 1.

Witnesses:
Russell Miles
Chas. O. Showey

Inventor:
Charlie Redd,
by H. Bitner.
Atty

No. 787,697. PATENTED APR. 18, 1905.
C. REDD.
MACHINE FOR CLOSING AND SEALING THE BOTTOM FLAPS OF CARTONS.
APPLICATION FILED DEC. 26, 1903.
12 SHEETS—SHEET 4.

No. 787,697. PATENTED APR. 18, 1905.
C. REDD.
MACHINE FOR CLOSING AND SEALING THE BOTTOM FLAPS OF CARTONS.
APPLICATION FILED DEC. 26, 1903.

12 SHEETS—SHEET 5.

Witnesses:
Russell C. Wiles
Chas. C. Shervey

Inventor:
Charlie Redd,
by H. Bitner
Atty.

No. 787,697. PATENTED APR. 18, 1905.
C. REDD.
MACHINE FOR CLOSING AND SEALING THE BOTTOM FLAPS OF CARTONS.
APPLICATION FILED DEC. 26, 1903.
12 SHEETS—SHEET 6.
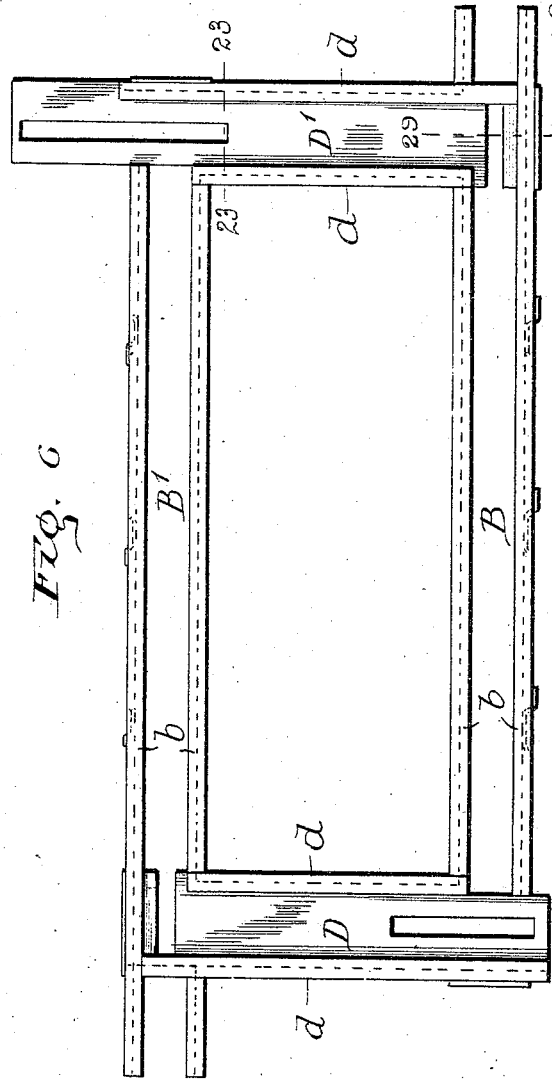
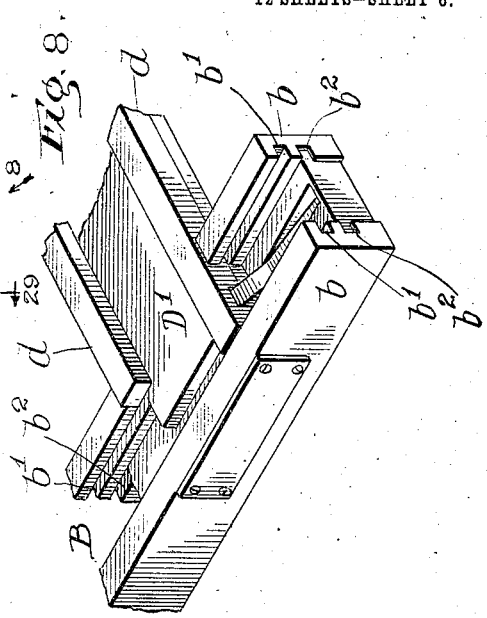
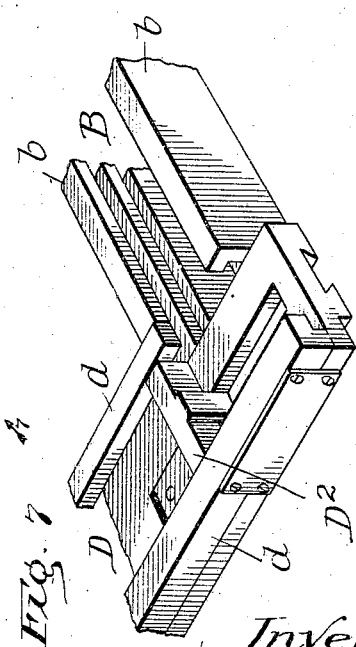
Witnesses:
Inventor:
Charlie Redd

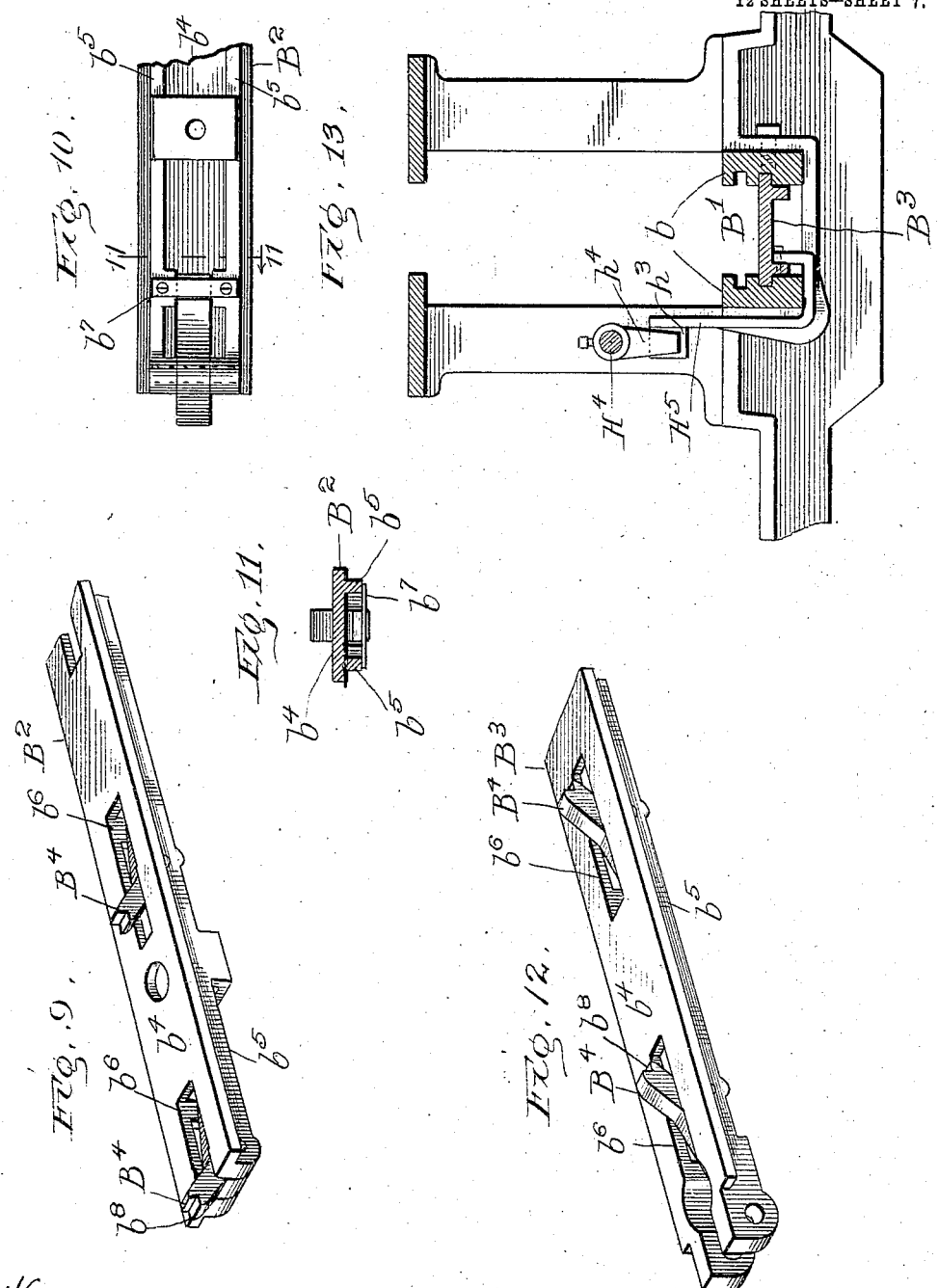

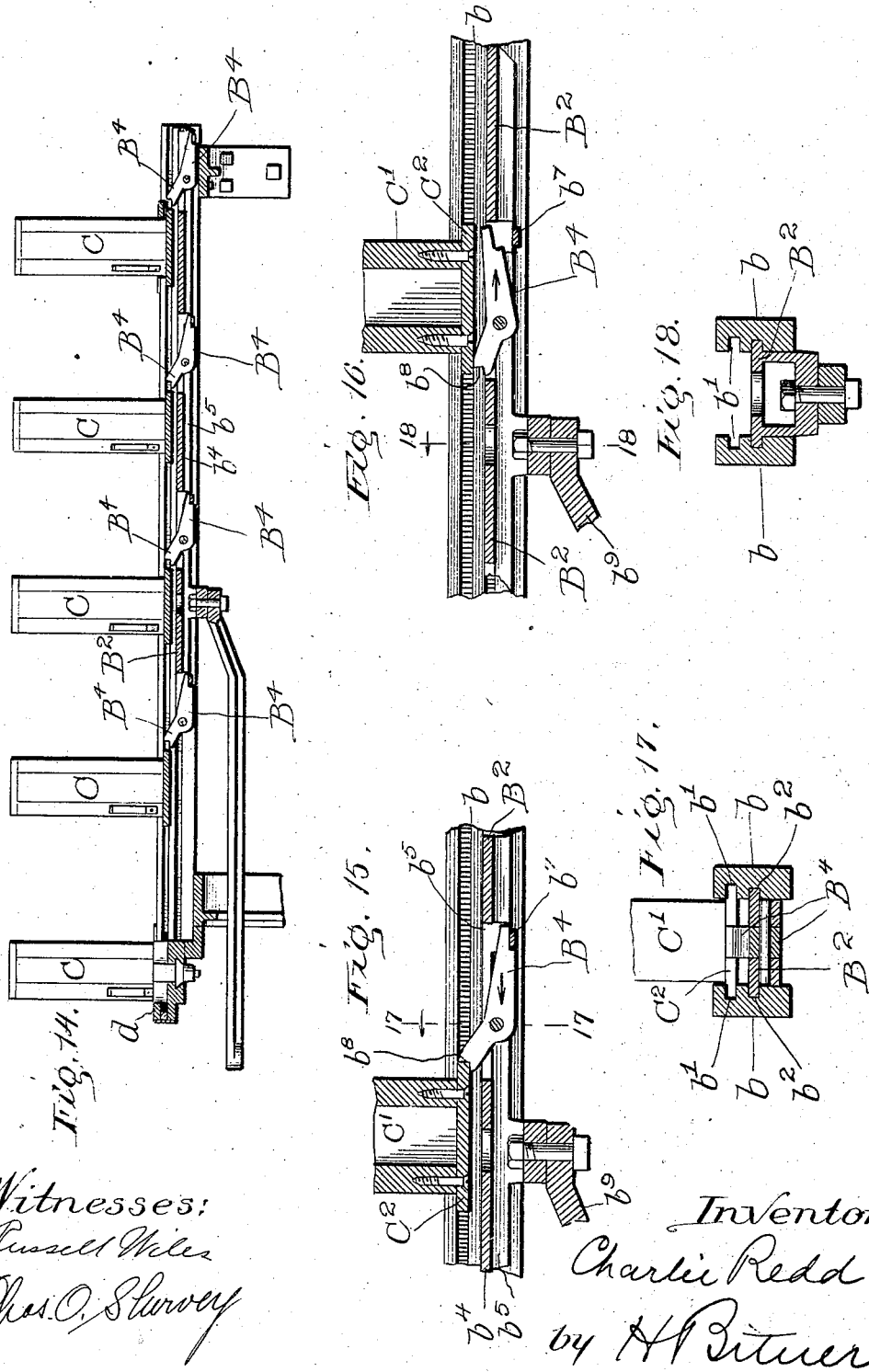

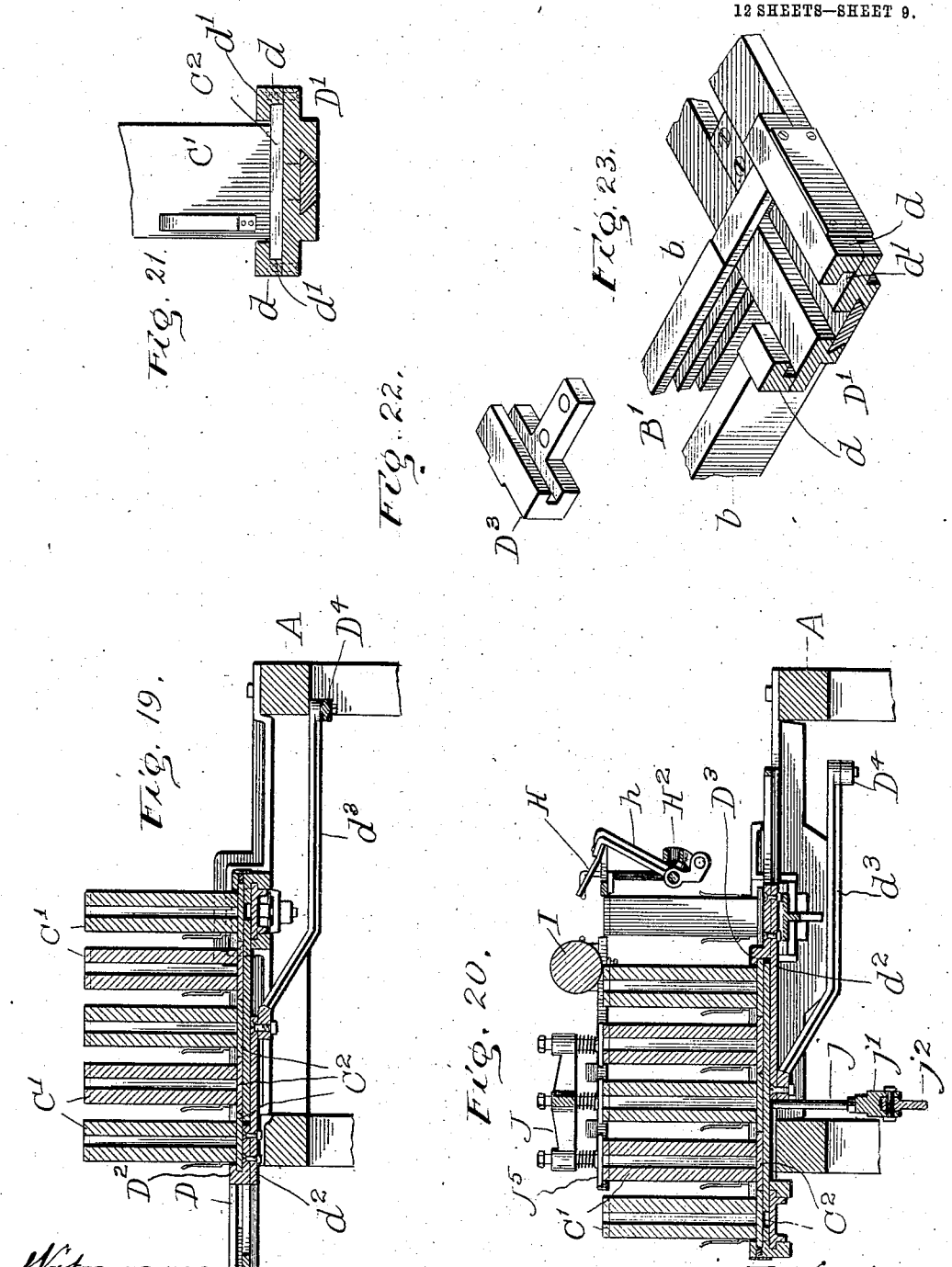

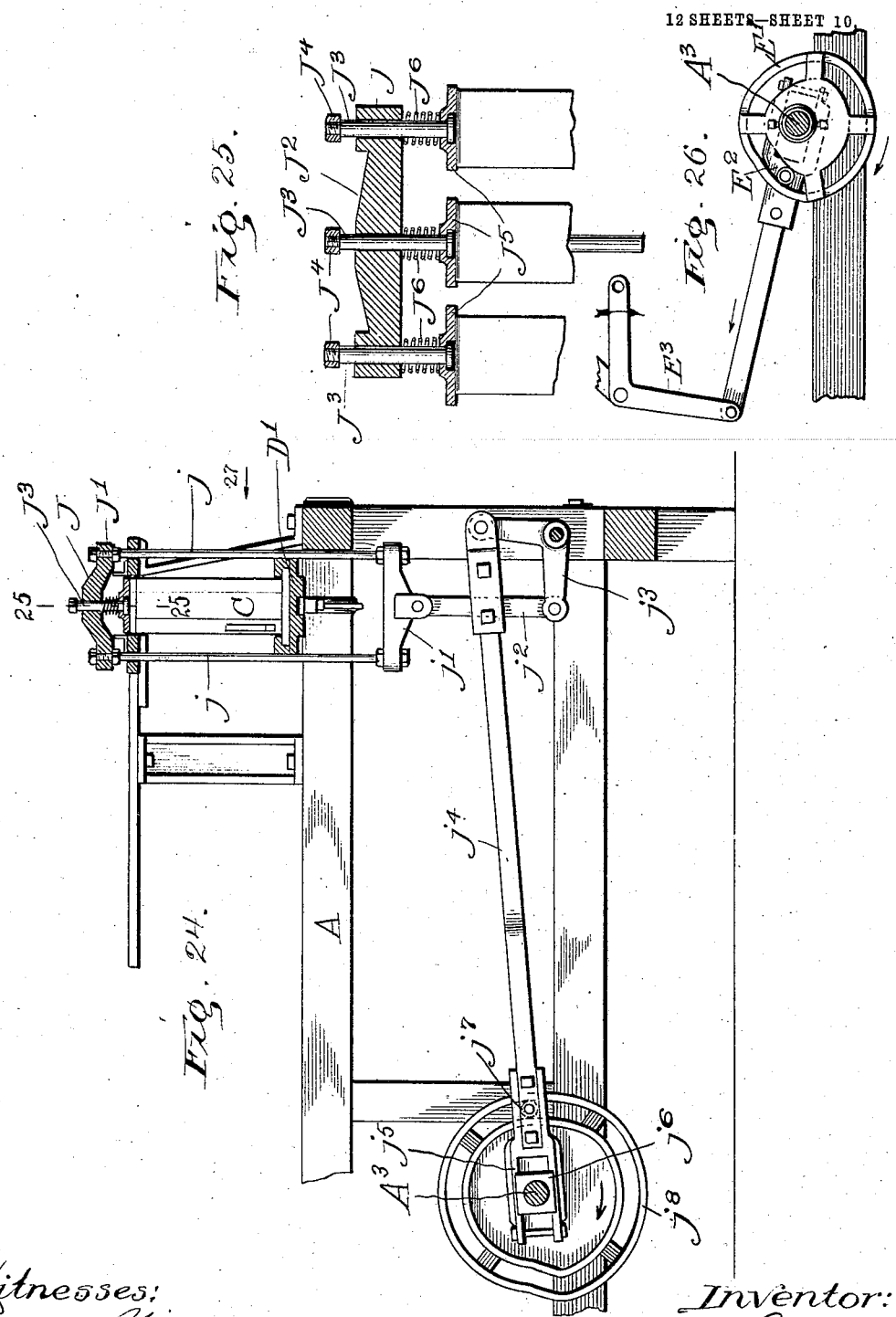

No. 787,697. PATENTED APR. 18, 1905.
C. REDD.
MACHINE FOR CLOSING AND SEALING THE BOTTOM FLAPS OF CARTONS.
APPLICATION FILED DEC. 26, 1903.
12 SHEETS—SHEET 11.
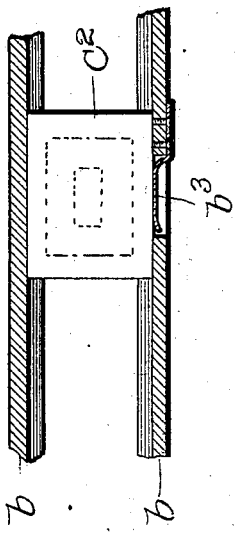
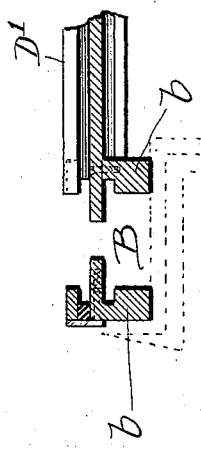
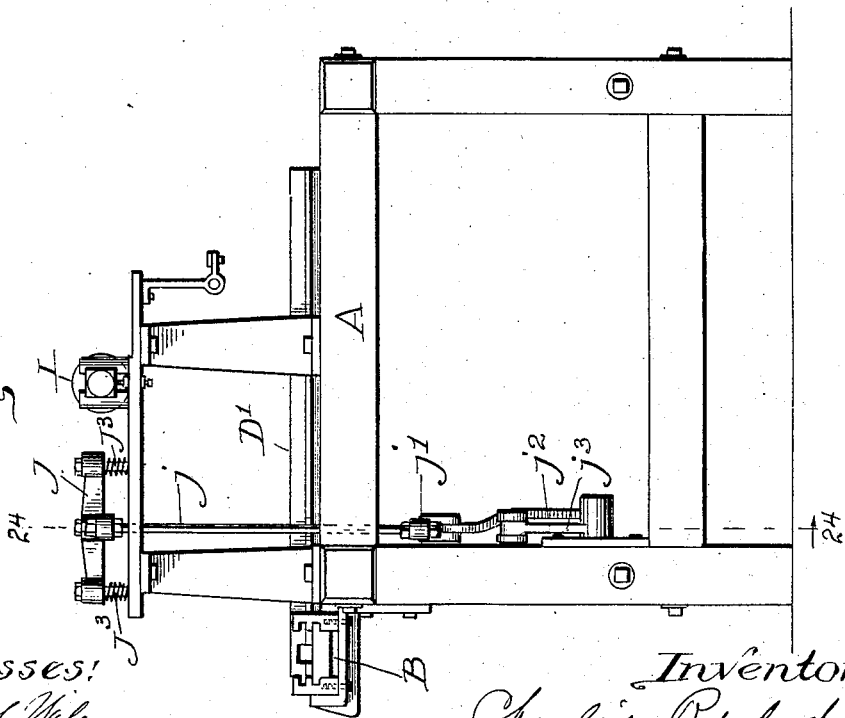
Witnesses:
Russell Wiles
Chas. O. Shervey
Inventor:
Charlie Redd
by H. P. Bitner
Atty.

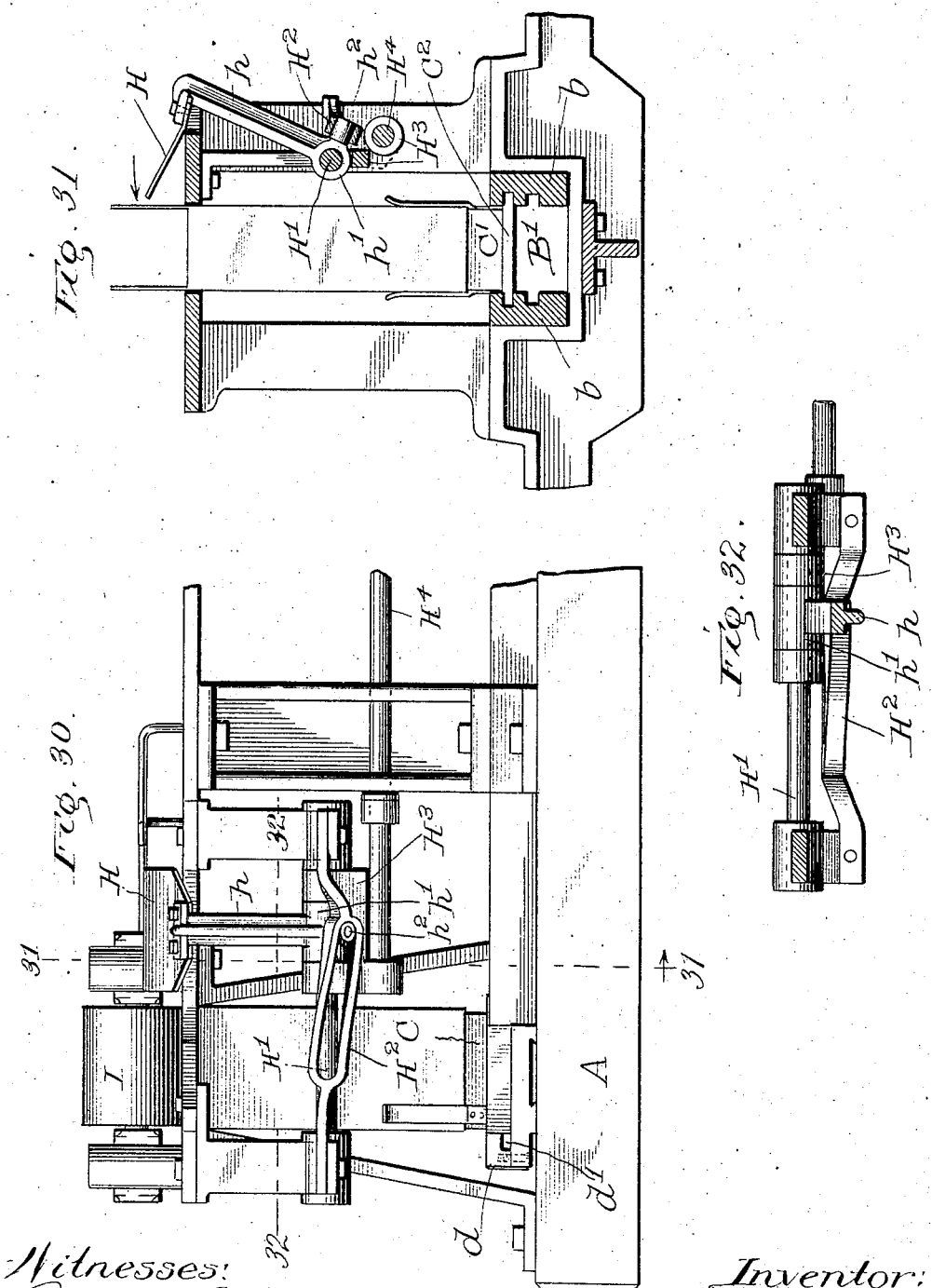

No. 787,697.

Patented April 18, 1905.

UNITED STATES PATENT OFFICE.

CHARLIE REDD, OF ROCKFORD, ILLINOIS, ASSIGNOR OF ONE-HALF TO ISAAC PIESER AND ONE-HALF TO CHARLES G. LIVINGSTON, OF CHICAGO, ILLINOIS.

MACHINE FOR CLOSING AND SEALING THE BOTTOM FLAPS OF CARTONS.

SPECIFICATION forming part of Letters Patent No. 787,697, dated April 18, 1905.

Application filed December 26, 1903. Serial No. 186,679.

*To all whom it may concern:*

Be it known that I, CHARLIE REDD, a citizen of the United States of America, residing at Rockford, in the county of Winnebago and State of Illinois, have invented certain new and useful Improvements in Machines for Closing and Sealing the Bottom Flaps of Cartons, of which the following is a specification.

My invention relates to certain new and useful improvements in machines for closing and sealing the bottom flaps of cartons; and its object is to produce a device of this class which shall be simple, strong, and efficient.

To this end my invention consists in certain novel features of construction, which are clearly illustrated in the accompanying drawings and described in this specification.

Figure 1:
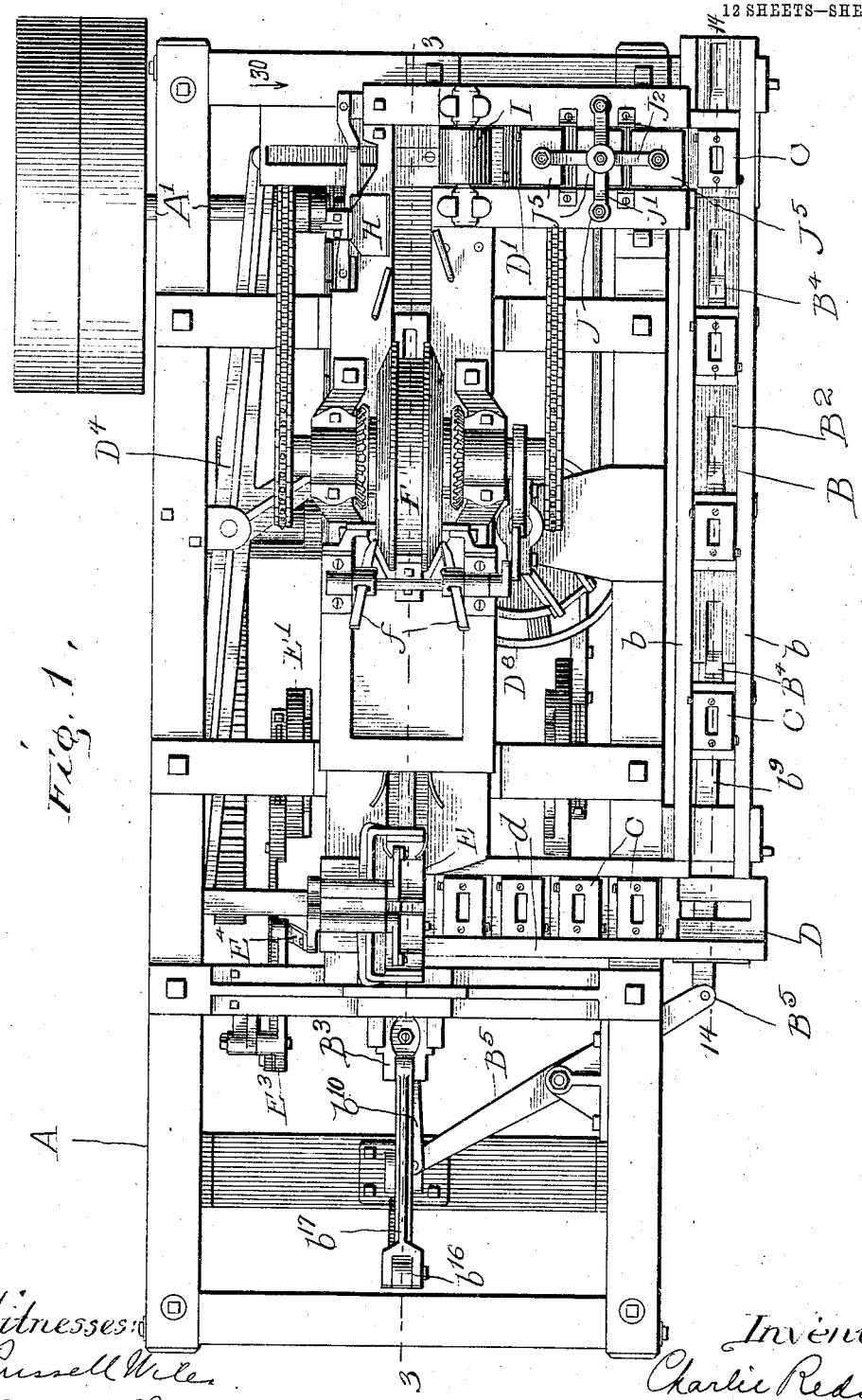
Figure 2:
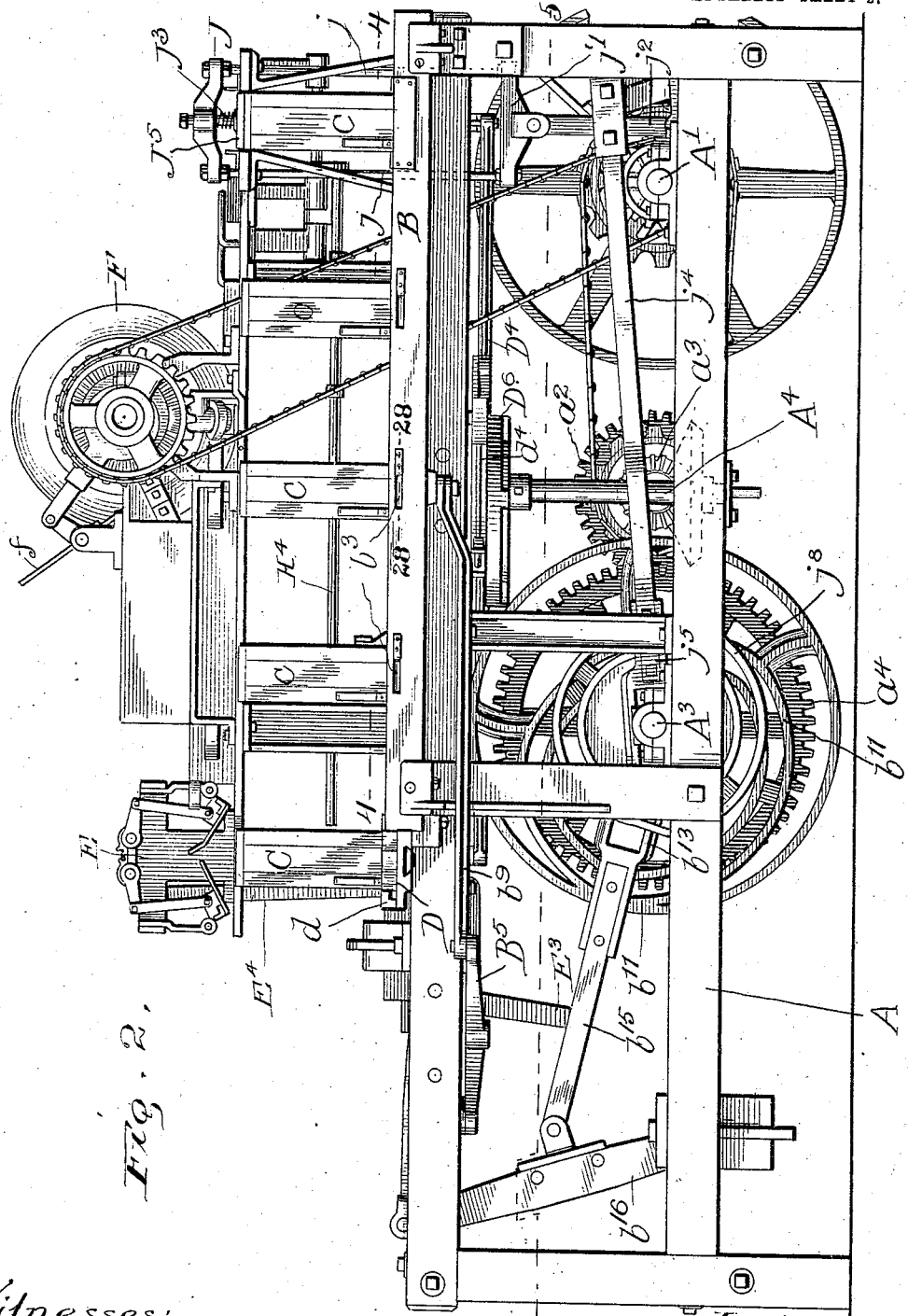
Figure 3:
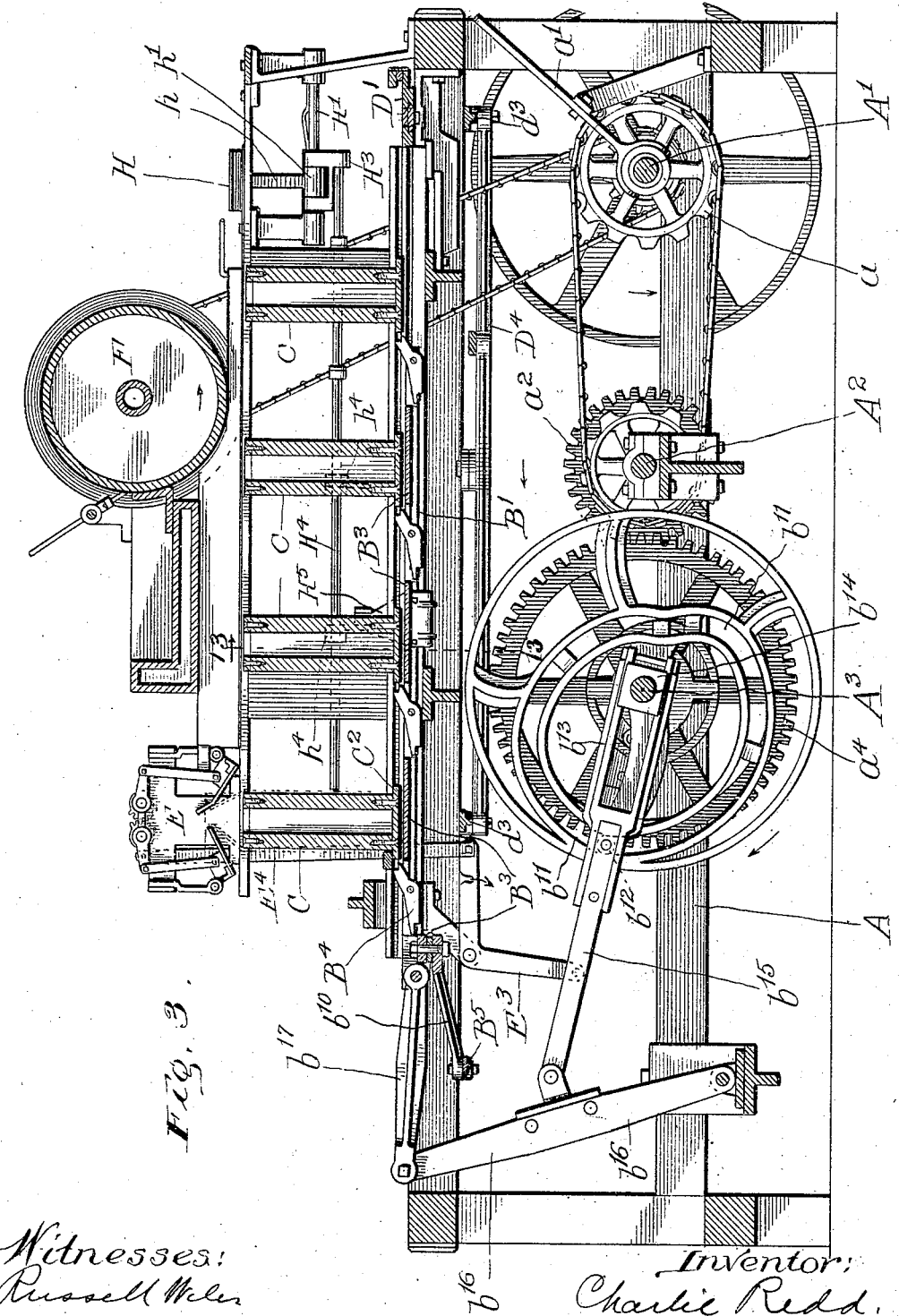
Figure 4:
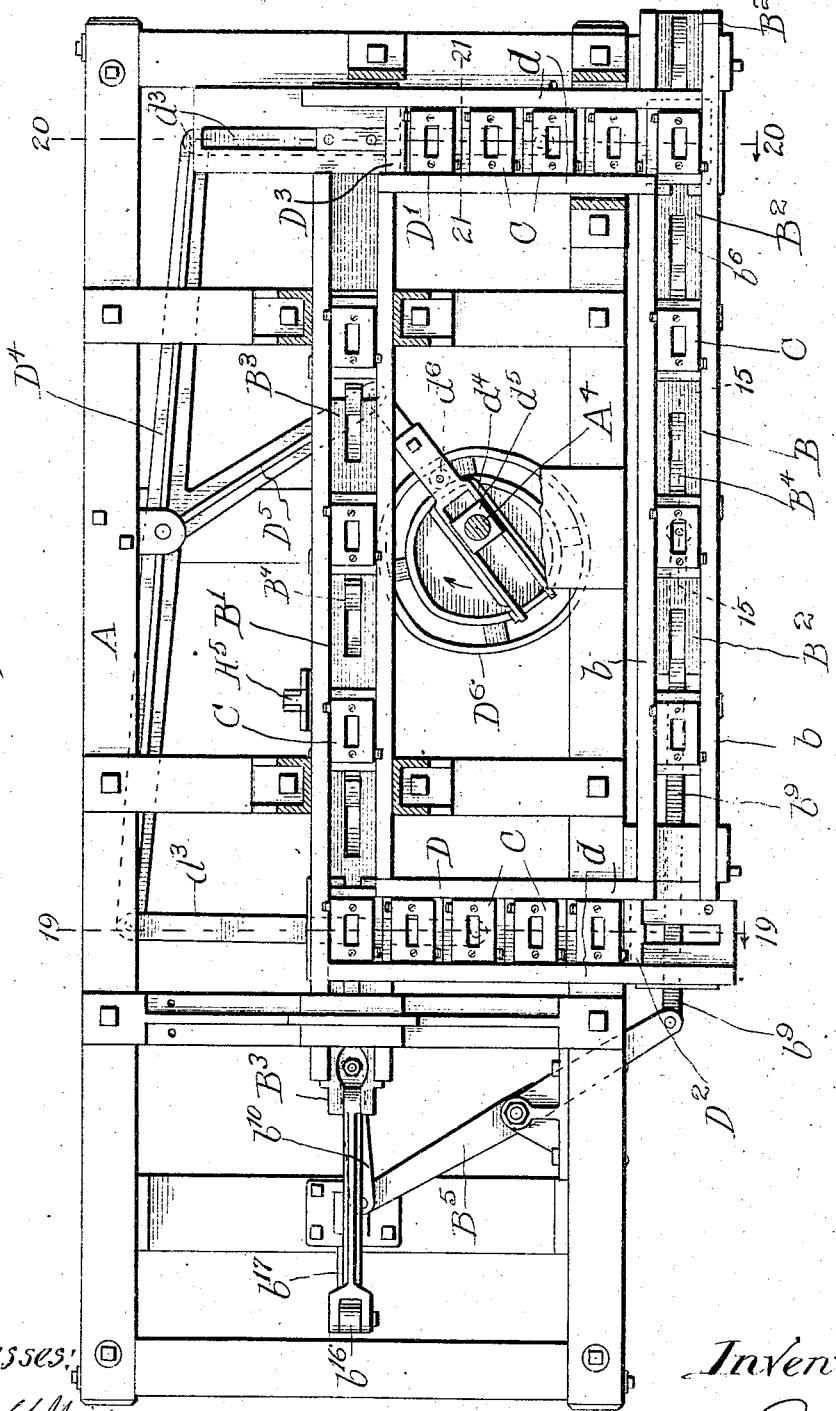
Figure 5:
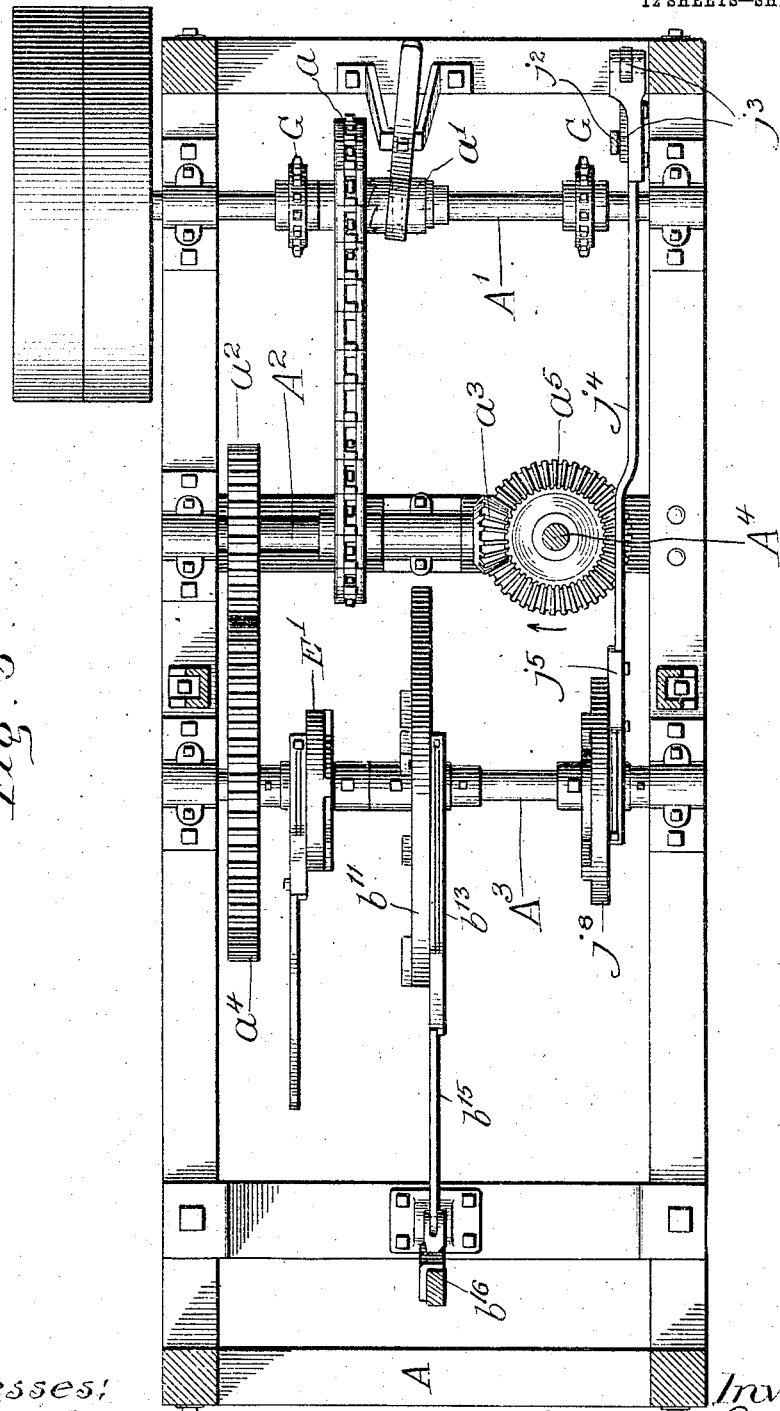

In the drawings, Figure 1 is a plan view of the machine, showing the operating parts in a position at which the table located beneath the flap folding and gluing mechanism has come to a position of rest at its limit of movement toward the left. Fig. 2 is a front view. Fig. 3 is a view partly in side elevation and partly in vertical longitudinal section, the line of section being indicated at 3 3 in Fig. 1. Fig. 4 is a plan view of the frame and the guides through which the blocks travel, showing also certain of the mechanism for moving said blocks, certain posts which support the mechanism above these parts being cut away in line 4 4 of Fig. 2. Fig. 5 is a view, partly in plan and partly in horizontal section, of the frame, gearing, and certain of the cams, the line of section being indicated at 5 5 in Fig. 2. Fig. 6 is a plan view of the guiding-frame. Fig. 7 is a perspective view of a corner of said frame looking in the direction of the arrow 7 in said figure. Fig. 8 is a similar view looking in the direction of the arrow 8 in Fig. 6. Fig. 9 is a perspective view of a fragment of the reciprocating table, located on the front of the machine. Fig. 10 is under plan of one end of said table. Fig. 11 is a vertical section taken in the line 11 11 of Fig. 10, showing the parts in their upright position. Fig. 12 is a perspective view of a fragment of the table which moves the blocks underneath the flap folding and gluing mechanism. Fig. 13 is a view, partly in elevation and partly in vertical transverse section, showing certain of the mechanism which operates the flap-folder which makes the next to the last fold, the line of section being indicated at 13 13 in Fig. 3. Fig. 14 is a vertical longitudinal section through the front guide of the guiding-frame, the line of section being indicated at 14 14 in Fig. 1. Fig. 15 is an enlarged detail longitudinal section taken in the line 15 15 of Fig. 4, showing the dog in engagement with the plate which supports the frame. Fig. 16 is a similar view showing said table in a position where the dog is sliding beneath said plate in its return movement. Fig. 17 is a detail vertical cross-section taken in the line 17 17 of Fig. 15. Fig. 18 is a similar section in the line 18 18 of Fig. 16. Fig. 19 is a vertical cross-section through the guideway running to the guideway underneath the flap folding and gluing mechanism, the line of section being indicated at 19 19 in Fig. 4. Fig. 20 is a similar view through the guideway running from said guideway underneath the flap folding and gluing mechanism to the forward longitudinal guideway, the line of section being indicated at 20 20 in Fig. 4. Fig. 21 is a detail vertical section through said guideway, the line of section being indicated at 21 21 in Fig. 4. Fig. 22 is a perspective view of the crosser running in the guideway shown in Fig. 19. Fig. 23 is a sectional perspective view of the point of junction between the transverse guideway shown in Fig. 19 and the guideway located underneath the flap folding and gluing mechanism, the transverse guideway being cut away along the line 23 23 in Fig. 6, but showing the cross-head in place therein. Fig. 24 is a front view of the mechanism for pressing down upon the flaps after they have been folded, the framework of the machine having been cut away, as indicated by the line 24 24 of Fig. 27. Fig. 25 is a detail vertical section in the line 25 25 of Fig. 24. Fig. 26 is a front view of the cam and certain of the levers for actuating the first flap-folders. Fig. 27 is an end view of the parts seen in Fig. 24 looking in the direction of the arrow 27 in said figure. Fig. 28 is a detail horizontal section taken in the line 28 28 of Fig. 2. Fig. 29 is a detail vertical section taken in the line 29 29 of Fig. 6. Fig. 30 is a detail rear elevation of a part of the frame and mechanism for making the next to the last fold, the direction of the view being indicated by the arrow 30 in Fig. 1. Fig. 31 is a detail vertical cross-section taken in the line 31 31 of Fig. 30, and Fig. 32 is a detail horizontal section in the line 32 32 of Fig. 30.

Before proceeding with a detailed description of the construction and operation of my machine I shall first describe in a general way the operation which it performs in order to make clear as the description of the parts progresses what the purpose of each portion is.

This is a machine of the type which is known as a "block-machine" as distinguished from a filled-carton machine, and it operates upon empty carton-blanks pasted together in the form of rectangular tubes, and its operation folds the bottom flaps and glues them to prepare them for receiving their contents. In operation the carton-blanks are slipped upon blocks over which they fit tightly, and these blocks, with the blanks, are moved through the machine with a step-by-step motion somewhat similar to that shown and described in my application on machines for closing and sealing the tops of cartons, filed July 13, 1903, Serial No. 165,267, which shows a machine for closing the tops of filled cartons. In the present machine, however, the blocks are moved around in a predetermined path, being propelled by suitable mechanism. They first go up a return-chute, where the cartons are placed upon them by operatives. They are then forced through a feed-chute at right angles to the return-chute and under a folder, which folds the front and rear flaps. They are then passed through an operating-trough, where glue is applied to the inner surfaces of the two side flaps and one of the side flaps is folded down upon the front and rear flaps. At the end of the operating-trough the blanks are shoved sidewise into an eduction-trough, passing under a weighted roller, which folds the second side flap down upon the first, and during the course of said progress down the eduction-chute they are subjected to strong vertical pressure, securing the flaps firmly together. At the end of the eduction-chute the cartons are removed from the blocks either by hand or by any of the well-known devices now upon the market, preferably by a pneumatic device which blows them from the blocks. Such devices are common and well known and are not shown in the drawings, as they would unnecessarily complicate the same, and form no essential part of the invention of this application. After the cartons are removed the blocks are again shifted sidewise into the return-chute, where a second set of cartons is placed upon them and the same cycle of operation is repeated.

Referring to the drawings for a more particular description of the mechanism, A indicates the base or main frame of the machine, and it is composed of a plurality of longitudinal and transverse members assembled to form a substantial and reasonably strong foundation for the working parts of the machine. Journaled on the base A is a shaft A', Fig. 5, provided at one end with a suitable pulley, by which it may be driven, and having upon it a sprocket $a$, adapted to be connected or disconnected, as desired, by a clutch $a'$ of any ordinary type. This sprocket $a$ is connected by a suitable chain with a second sprocket upon a main driving-shaft $A^2$, also journaled in the frame. The shaft $A^2$ is provided at one end with a pinion $a^2$ and at the other with a bevel-gear $a^3$, which mesh, respectively, with a pinion $a^4$ upon a horizontal cam-shaft $A^3$ and a bevel-pinion $a^5$ upon a vertical cam-shaft $A^4$, Fig. 2. The gears connecting the shaft $A^2$ with the cam-shafts $A^3 A^4$ are so proportioned that the cam-shafts move at an equal speed and at half the speed of the main driving-shaft $A^2$.

Referring now to Figs. 4 and 6, B is a return-chute, and B' is a chute under the operating-trough. These two chutes are similar in all essential particulars, and their construction can be best seen in Figs. 14 to 18. Each chute has a track $b$ upon each side, each of which tracks has two horizontal grooves $b'$ $b^2$ upon its inner edge. The grooves $b'$ are adapted to receive and guide the carton carrying the blocks, which are indicated in the drawings by C. Each block consists of a hollow rectangular structure C' of proper size to receive the carton, and each is provided at its lower end with a flange $C^2$, extending outward upon all sides and adapted to run in the grooves $b'$.

D, Figs. 4 and 6, indicates the feed-chute, and D' the eduction-chute, of the machine, and these chutes, like the return and operating chutes, are similar in all essential particulars and are best seen in Figs. 7 and 8. These chutes, like the chutes B B', are provided with side rails $d$ $d$, each having an inner groove $d'$ upon its inner side, the grooves being of the same height and size as the grooves $b'$ in the return and operating chutes, so that the grooves $b'$ $d'$ together form a continuous rectangular guideway about the machine through which the blocks C can be passed as desired, each block being held vertical and prevented from rotation, but being free to move around through the chutes as desired. Suitable slots are cut through one of the rails $b$ of the feed and return chutes, and through these slots project light springs $b^3$, Fig. 28, which press against the flanges upon the blocks C and tend to hold the blocks in position wherever they may be. As before pointed out, the blocks move through the machine with a step-by-step motion, and the springs are provided only at the points where the blocks are stationary to prevent them from being jarred out of place when not intended to be in motion.

Two reciprocating tables $B^2$ $B^3$, Figs. 9 to 17, are provided in the return and operating chutes B B', and these tables are capable of longitudinal reciprocation in the lower grooves $b^2$ of the tracks $b$, heretofore described. The tables $B^2$ $B^3$ are substantially similar in construction. Each consists of a flat portion $b^4$, having downwardly-extending flanges $b^5$. Dogs $B^4$ are journaled between the downwardly-extending flanges, and their points project upward through slots $b^6$, cut in the flat portions $b^4$. Each dog is so pivoted that it normally lies in the position indicated in Fig. 9, further upward motion of the upwardly-extending point being prevented by the engagement of the lower end of the dog with a small strap $b^7$, extending from one flange $b^5$ to the other. The upwardly-extending point of each dog is provided with a notch $b^8$, which is adapted to engage with the flanges $C^2$ upon the blocks C. It will be obvious that by reciprocating either of the tables $B^2$ $B^3$ the blocks C will be moved forward with a step-by-step motion, the dogs $B^4$ engaging with the blocks when moving in one direction, as shown in Fig. 15, and sliding under the same when moving in the opposite direction, as shown in Fig. 16. It is to be understood, of course, that the points of the dogs in the table $B^2$ extend to the left and in the table $B^3$ to the right, so that reciprocating the two tables will move the blocks in the return-chute to the left and in the operating-chute to the right.

A walking-beam $B^5$, Fig. 4, is pivoted to the frame of the machine to oscillate in a horizontal plane. The opposite ends of this walking-beam are connected to the adjacent ends of the tables $B^2$ $B^3$ by links $b^9$ $b^{10}$, respectively. This synchronizes the movement of the two tables and causes them to move in opposite directions at the same time and at the same speed. A cam $b^{11}$, Fig. 3, upon the horizontal cam-shaft $A^3$ engages with a roller $b^{12}$ upon a slotted head $b^{13}$, reciprocating upon a block $b^{14}$. The head $b^{13}$ is connected by an arm $b^{15}$ to a lever $b^{16}$, the upper end of which is connected by a link $b^{17}$ with the table $B^3$, causing it to reciprocate as the cam is rotated. It is evident that this structure so far as described will operate as the shafts are rotated to cause blocks to move continuously along the return and operating chutes with a step-by-step motion, the motion in the two chutes being in opposite directions.

The two transverse chutes—that is, the feed-chute D and the eduction-chute D'—are slotted at their rear ends, Figs. 6 and 7, and in the slots are guided bars $d^2$, upon which are mounted transverse plates $D^2$ $D^3$ in the feed-chutes and eduction-chutes, respectively. These plates $D^2$ $D^3$ are adapted when the bars $d^2$, upon which they are mounted, are reciprocated in the slots to engage with the flanges upon the carton-carrying blocks and force them forward along the feed and eduction chutes. The blocks $d^2$ are connected by links $d^3$, Figs. 19 and 20, to the opposite ends of a walking-beam $D^4$, Fig. 4, pivoted to swing horizontally on the frame of the machine, said walking-beam being provided with a radially-extending arm $D^5$, the end of which is connected to a slotted head $d^4$, guided upon a block $d^5$, and having a roller $d^6$, engaged by a groove in a horizontal cam-wheel $D^6$, mounted upon the rotating vertical cam-shaft $A^4$. It will be evident that the rotation of this cam $D^6$ will reciprocate the slotted head $d^4$ and swing the walking-beam $D^4$ upon its pivot, thereby causing the two plates $D^2$ $D^3$ to reciprocate and forcing any blocks which may be in position to pass up through the feed and eduction chutes. The cams which operate the feeding devices are timed to move the longitudinal feeders forward as the transverse feeders are returning from the position shown in Fig. 4, the longitudinal feeders forcing the blocks into the ends of the transverse chutes just as the plates $D^2$ $D^3$ are withdrawn far enough to permit the blocks to enter. The transverse feeders are thereupon advanced and the longitudinal feeders drawn back, the blocks in the transverse chutes being moved forward one step and the last one in each transverse chute passing out into the longitudinal chutes just as the tables therein have moved back far enough to permit the blocks to enter the chutes without colliding with the dogs upon the tables. This brings the parts to the position illustrated in Fig. 4 and ready for another operation. It will be seen that one feeder only is provided in each transverse chute, a solid line of blocks which fills the chute being provided, while in the longitudinal chute a separate contact-piece is provided for each block in order that they may be spaced a sufficient distance apart to be readily operated upon by the operating mechanisms.

The first device which operates upon the cartons is the folder for the front and rear flaps, which is indicated by E in the drawings, Figs. 2 and 3. This folder is similar in all essential particulars to that illustrated, described, and claimed in the patent issued upon an application of myself and George H. Cormack on July 14, 1903, No. 733,510, and for this reason no detailed description thereof will be necessary. The folder is operated by a cam E', Figs. 5 and 26, upon the horizontal cam-shaft $A^3$, said cam engaging with a roller upon a slotted head $E^2$, said slotted head being connected by a suitable arm with a bell-crank lever $E^3$, Figs. 3 and 26, mounted upon the frame of the machine and swinging in a vertical plane. One arm of this bell-crank lever is connected by a vertical link E$^4$ with a projecting arm upon one of the rotating shafts of the folder and causes it to operate in the ordinary way. The folding operation is timed to take place immediately after the parts reach the position shown in Fig. 4 and before the dogs upon the reciprocating tables come in contact with the carton-carrying blocks. The folding-vanes remain down upon the blocks for some time after the blocks begin to move longitudinally of the machine and hold the flaps firmly in place until they pass under the top of the operating-trough and are held in place thereby. The next device which operates upon the cartons is the gluing-wheel, which is constructed exactly like that shown and described in my application for patent on machines for closing and sealing the tops of cartons, filed July 13, 1903, Serial No. 165,267. The gluing-wheel is indicated by F in the drawings and is driven by sprocket-chains running over sprocket-wheels G, Fig. 3, upon the shaft A'. The gluing-wheel is provided with stirrers $f$, similar in every respect to those described in the above-mentioned application, and no detailed description thereof will be necessary. After passing the gluing-wheel one of the side flaps of the cartons must be folded. This is accomplished by a folding-vane H, Figs. 3, 30, and 31. This vane is operated in a manner somewhat similar to the folding-vane of my prior application, above referred to, but differs in some features of construction, and consequently will be fully described. The vane H is mounted upon an arm $h$, terminating in a hub $h'$, Figs. 30 to 32, which is reciprocable and rotatable upon a longitudinally-extending rod H'. The hub $h'$ is provided with a radially-extending pin $h^2$, which runs in a spiral guide H$^2$. A block H$^3$, having upwardly-projecting ears upon either side of the hub $h'$, also runs upon the rod H', and this block has a longitudinally-extending rod H$^4$ secured to it, which is suitably guided to reciprocate longitudinally of the machine. The table B$^3$ is provided with an upwardly-extending arm H$^5$, Fig. 13, bearing an ear $h^3$, which is adapted to engage with two ears $h^4$ (dotted lines, Fig. 3) upon the rod H$^4$ as the table is reciprocated, and this engagement with the reciprocating rod H$^4$ moves the hub $h'$ back and forth longitudinally of the machine, the same being rotated upon the rod H', as it is reciprocated, in consequence of its engagement with the spiral guide H$^2$. This rotation swings the vane H up over the block and folds down the first side flap. The two ears $h^4$ $h^4$ are separated some distance, so that the table can be drawn back to a considerable extent before the vane is drawn from place in contact with the flap. This folding device is timed to swing forward as the table reaches its most advanced position and to remain down during a considerable portion of the advance of the transverse feeders. After this first side flap has been folded the plate D$^3$ comes into contact with the block, as heretofore described, and forces it into the eduction chute or trough. The second side flap is folded as it enters this trough by means of a roller I, journaled in the frame of the machine. As the next succeeding carton enters the eduction-trough the first one is forced forward and passes under a compression device, which will now be described. A vertically-movable spider J, Figs. 1, 24, and 25, is provided, having two arms which cross each other, one arm, J', extending longitudinally and the other arm, J$^2$, transversely of the machine. The longitudinal arm J' has at its ends two rods $j$, Fig. 24, guided to move vertically in the frame of the machine, and these rods are connected at their lower ends by a bar $j'$, which is connected by a link $j^2$ to a bell-crank lever $j^3$, pivoted upon the frame of the machine to swing in a vertical plane. The opposite end of this bell-crank lever is connected by a link $j^4$ to a slotted head $j^5$, guided upon a block $j^6$ and having a roller $j^7$, engaged by a cam $j^8$ upon the horizontal cam-shaft A$^3$. It will be seen that this cam when rotated will reciprocate the cross-head, and thereby cause vertical movement of the spider. The transverse arm J$^2$ of the spider is provided with three perforations, Fig. 25, through which extend longitudinally-movable rods J$^3$, at the upper end of which are nuts J$^4$, which limit the longitudinal movement of the rods. These rods are provided at their lower ends with plates J$^5$, slightly larger than the tops of the blocks, and springs J$^6$ surround the rods J$^3$ and hold the plates normally downward with respect to the spider J. While the block is moving forward from the first to the second position in the eduction-trough the spider and the plates are held up by the cam. When the second position is reached, the spider and the plates carried thereby are brought down firmly upon the blocks, squeezing the carton-flaps with a firm pressure and tending to set the glue. As another block is fed into the eduction-trough the spider is again raised; but at the end of each forward movement the plates are brought down firmly upon the flaps, so that in passing through the eduction-trough each carton receives the pressure of the roller I and three successive pressures, one from each of the plates J$^3$. In this way a firm and tightly-closed carton is assured. This completes the description of the operation of the machine.

I realize that considerable variation is possible in the details of this construction without departing from the spirit of the invention, and I therefore do not intend to limit myself to the specific form herein shown and described.

I claim as new and desire to secure by Letters Patent—

1. In a device of the class described, the combination with suitable gluing and folding devices, of an endless rectangular guideway having two transverse and two longitudinal guides, a series of blocks in the guideway, a reciprocating table in each longitudinal guide, means for reciprocating the table, a plurality of dogs pivoted to the tables, having points extending into the path of the blocks, the points on each series of said dogs extending in opposite directions and each being movable in one direction with respect to the blocks and not movable in the opposite direction, and mechanism for propelling the blocks through the transverse guides.

2. In a device of the class described, the combination with suitable gluing and folding devices, of an endless rectangular guideway having two transverse and two longitudinal guides, a series of blocks in the guideway, a longitudinally-reciprocable table in each of the longitudinal guides, means for reciprocating the tables, dogs pivoted to the tables and having points extending upward into the path of the blocks, the points of the dogs upon the two tables extending in opposite directions, and a plunger operating adjacent to the end of each transverse guide, and adapted to force each block in succession into the mouth thereof.

3. In a device of the class described, the combination with suitable folding and gluing devices, a guideway extending adjacent to said folding and gluing devices, a plurality of blocks, and means for moving them through the guideway with a step-by-step movement, of a spider situated above the guideway and beyond the last folding device, rods extending through said spider and movable therein, plates on the lower ends of said rods, springs surrounding the rods, exerting a downward pressure upon the plates with respect to the spider, means for lowering the spider to bring the same into contact with the blocks when the blocks are at rest and for raising the spider before the blocks begin to move.

4. In a device of the class described, the combination with suitable folding and gluing devices, a guideway extending adjacent to said folding and gluing devices, and a plurality of blocks in the guideways, of a spider situated above the guideway and beyond the last folding device, rods extending through the spider and movable therein, plates on the lower ends of the rods, springs surrounding the rods and exerting a downward pressure upon the plates with respect to the spider, means for moving the blocks beneath the spider with a step-by-step movement, and means for lowering the spider to press the plates into contact with the blocks when the blocks are at rest and for raising the spider before the blocks begin to move.

In witness whereof I have signed the above application for Letters Patent, at Chicago, in the county of Cook and State of Illinois, this 15th day of December, A. D. 1903.

CHARLIE REDD.

Witnesses:
 RUSSELL WILER,
 CHAS. O. SHERVEY.